Nov. 28, 1961 L. E. GREENLAW 3,010,738
DETACHABLE HEAT CONDUIT FITTINGS
Filed Jan. 4, 1960 2 Sheets-Sheet 1
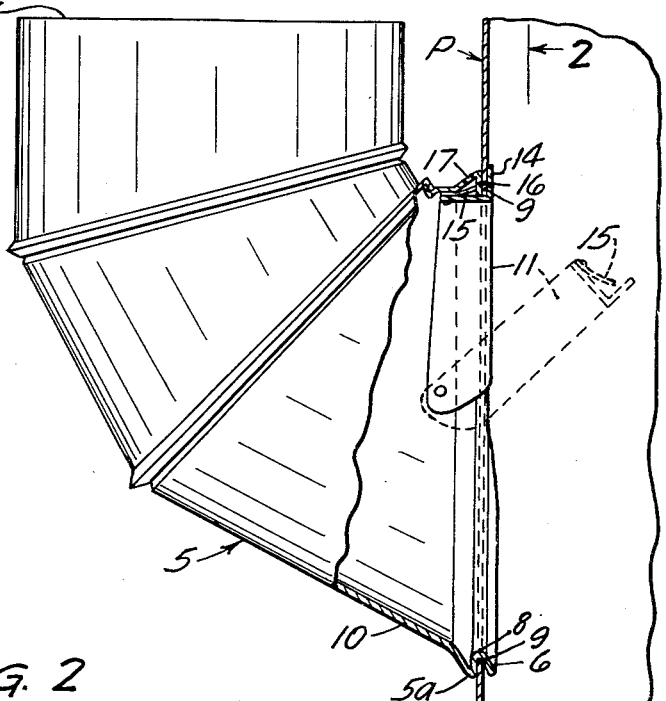
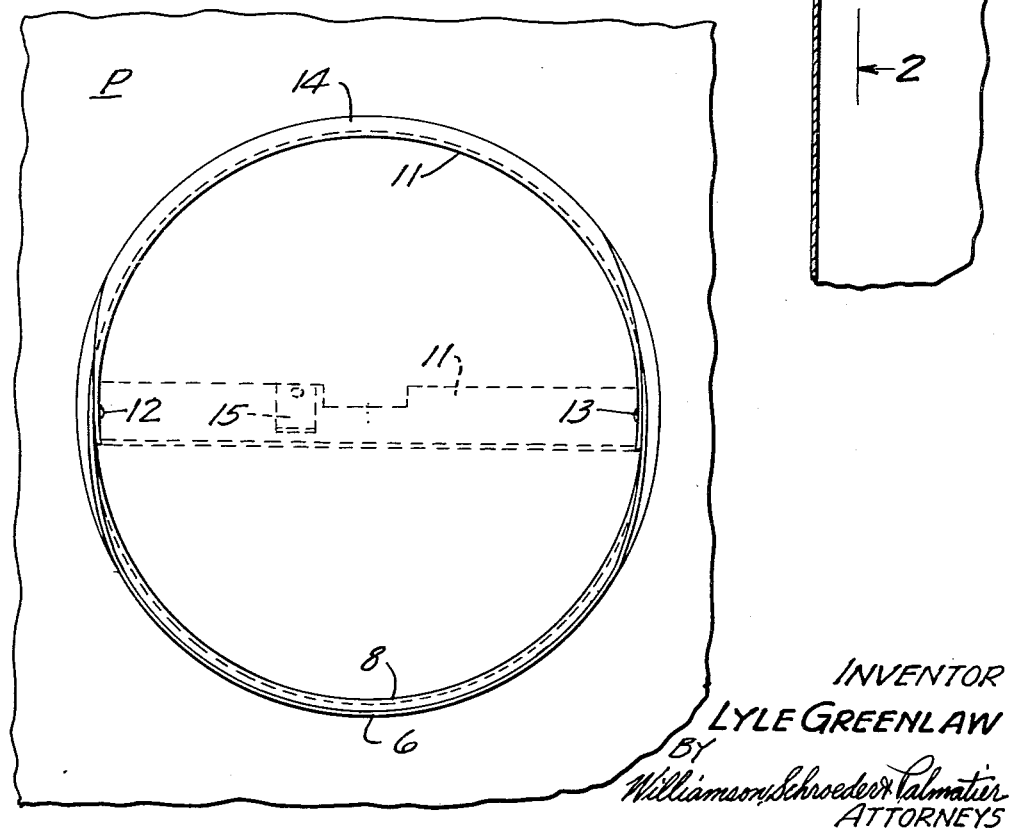
INVENTOR
LYLE GREENLAW
BY
Williamson, Schroeder & Palmatier
ATTORNEYS

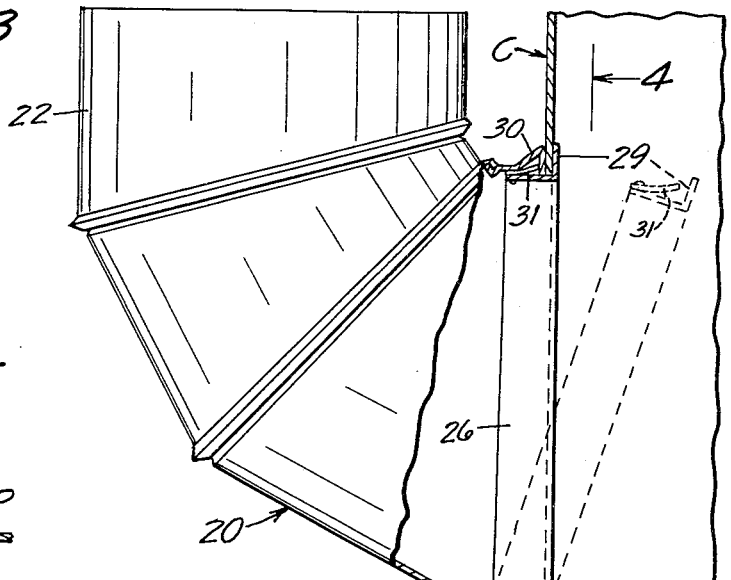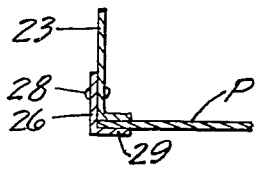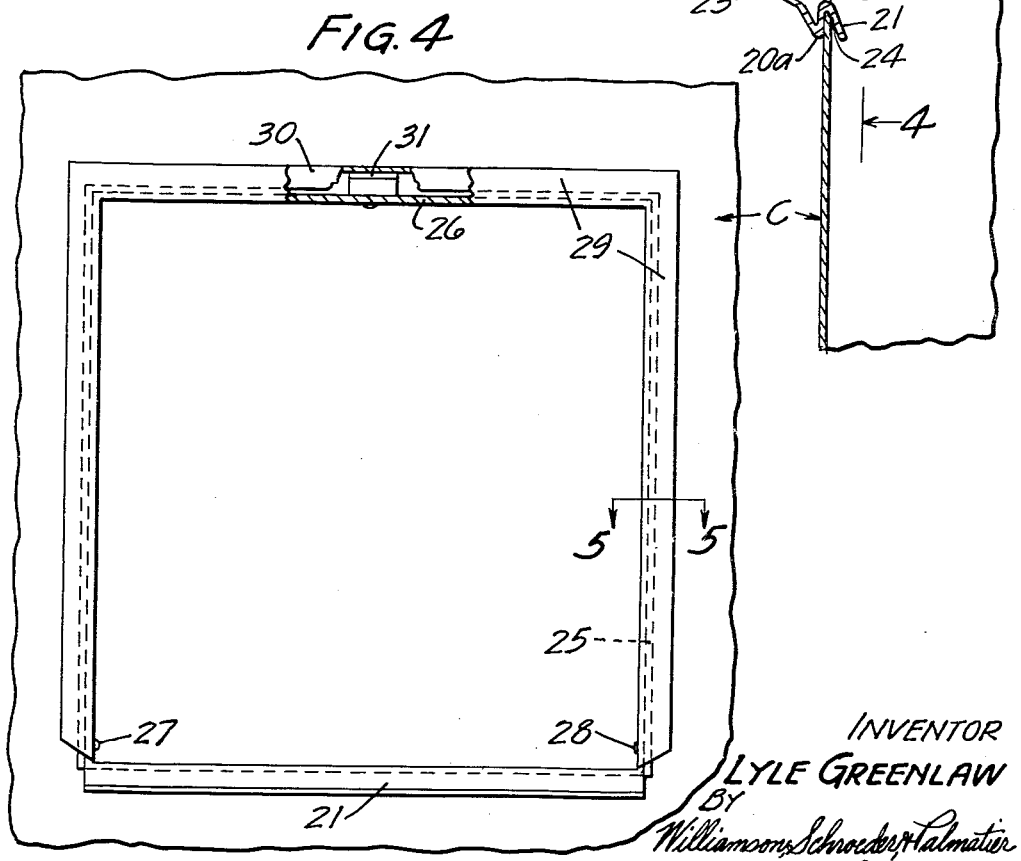

United States Patent Office 3,010,738
Patented Nov. 28, 1961

3,010,738
DETACHABLE HEAT CONDUIT FITTINGS
Lyle E. Greenlaw, Detroit Lakes, Minn., assignor to Snappy, Inc., Detroit Lakes, Minn., a corporation of Minnesota
Filed Jan. 4, 1960, Ser. No. 107
11 Claims. (Cl. 285—189)

This invention relates to conduit fittings. More particularly, it relates to fittings of the type utilized and designed for connecting hot air conduits of heating systems to a hot air plenum chamber by cutting a hole in the wall of the plenum chamber and then securing the hot air conduit to the opening-defining portions of the plenum chamber wall by means of a fitting.

This application is a continuation-in-part of my previous application for patent, Serial No. 713,027 filed by me February 3, 1958, now abandoned and entitled "Detachable Heat Conduit Fitting." It is also a continuation-in-part of my previous application for patent, Serial No. 771,816 filed by me November 4, 1958, now abandoned and entitled "Rectangular Detachable Conduit Fitting." This application represents a consolidation of my two above mentioned previously filed applications in order to obtain generic claims as well as claims specific to each of the structures shown in said previous applications.

It is a general object of my invention to provide a novel and improved detachable heat conduit fitting which is simple and inexpensive to manufacture and apply.

A more specific object is to provide a novel, inexpensive, and simple heat conduit fitting which is unique in construction and greatly facilitates the connection of a hot air conduit to such a plenum chamber wall.

Another object is to provide a novel and improved heat conduit fitting which can be readily and easily locked into place and which may be easily unlocked and detached when desired.

One of the primary features of my novel and improved heat conduit fitting is its simple construction and the ease with which it may be attached or detached to the opening-defining portions of a plenum chamber wall. In addition, it is extremely simple to manufacture and because of its simplicity it is relatively inexpensive. Moreover, it positively locks the hot air conduit to the opening-defining portions of the plenum chamber wall in a novel manner which makes it relatively easy to accomplish the attachment of the hot air conduit to such a plenum chamber.

Another object is to provide a heat conduit fitting so simple in design and construction as to effect a substantial savings in the cost of manufacture of such a fitting.

Another object of my invention is to provide a novel and improved detachable heat conduit fitting of rectangular or circular shape which is simple and inexpensive to manufacture and apply.

Another object is to provide a novel, inexpensive, and simple heat conduit fitting which is unique in construction and greatly facilitates the connection of a hot air conduit to a plenum chamber wall having a rectangularly shaped opening therein.

Another object is to provide a novel and improved heat conduit fitting which can be readily and easily locked into place in a rectangular opening in a plenum chamber wall and which may be easily unlocked and detached when desired.

Another object is to provide a heat conduit fitting so simple in design and construction as to effect a substantial savings in the cost of manufacturing such a fitting designed to be utilized with rectangular openings in plenum chamber walls.

These and other objects and advantages of my invention will more fully appear from the following description made in connection with the accompanying drawings wherein like reference characters refer to similar parts throughout the several views and in which:

FIG. 1 is a side elevational view of one embodiment of my invention with the plenum chamber engaging portions thereof shown in vertical section and the opening-defining portions of the plenum chamber also shown in vertical section; and FIG. 2 is an end elevational view of the embodiment shown in FIG. 1 taken approximately along line 2—2 of FIG. 1 from within the plenum chamber;

FIG. 3 is a side elevational view of a second embodiment of my invention with the plenum chamber engaging portions thereof shown in vertical section at the upper and lower extremities of the fitting and the opening-defining portions of the plenum chamber also shown in vertical section;

FIG. 4 is an end elevational view of the embodiment shown in FIG. 3 taken along approximately line 4—4 of FIG. 3 from within the plenum chamber; and FIG. 5 is a sectional view on an enlarged scale taken along approximately line 5—5 of FIG. 4.

One embodiment of my invention as shown in FIGS. 1–2 may include a tubular member preferably made of metal and indicated generally by the numeral 5. This tubular member 5 has a flanged portion 5a at one end thereof extending outwardly from the wall thereof and at an angle thereto and having a sealing area lying substantially in a plane. This flanged portion 5a has outer dimensions greater than those of the opening-defining portions of the plenum chamber to overlie the same. As shown, this tubular member 5 is provided with means adapted to engage the opening-defining portion of the plenum chamber, said means consisting of a radially outwardly extending flange 6 at one side of the opening-defining portions of that member at the ends thereof. The tubular member 5, of course, is open at both of its ends and the one end 7 is adapted to be inserted or otherwise cooperatively connected with the hot air conduit (not shown) which is to be connected to the plenum chamber. The latter is indicated generally by the letter P.

The flange 6 extends only a portion of the way around the open end of the tubular member 5 as best shown in FIG. 2. This flange 6 is an integral part of the tubular member 5 and is formed by the creation of a valley indicated by the numeral 8 which is stamped into the opening-defining portions of the tubular member 5. As shown in FIGS. 1 and 2, this flange 6 engages the opening-defining portions of the plenum chamber P which have been indicated by the numeral 9. These opening-defining portions 9 extend into the channel or groove 8 when the fitting 5 is secured to the plenum chamber.

Pivotally mounted upon the end portion indicated by the numeral 10 is an arcuately shaped plenum chamber wall engaging member 11. This member 11 is preferably an arcuately shaped strip of metal pivotally secured by rivets 12 and 13 to the opening-defining portions of the tubular member 5 at the end portion 10. It will be noted that this element 11 pivots about the rivets 12 and 13 which means that the pivotable movement thereof is about a radial axis relative to the tubular member 5. As a result this member 11 may swing outwardly of the tubular member 5 to the position shown in broken lines in FIG. 1.

The arcuately shaped member 11 is provided with a radially outwardly extending flange 14. This flange 14 serves to engage the inner surface of the opening-defining portions of the plenum chamber P when the member 11 is in latched position as is shown in FIG. 1. Thus, it can be readily seen that the member 11 serves to cooperatively engage the opening-defining portions of the plenum chamber P to positively secure the tubular member 5 to the plenum chamber. The flange 14 extends substantially concentric to the walls of the tubular member 5 and engages substantially all of the opening-defining portions of the plenum chamber wall P which are not engaged by the flange 6.

It will be noted that the arcuately shaped member 11 is secured to the inner surface of the tubular member 5 and pivots inwardly of the outer end of that member when moved to plenum chamber wall engaging position. The flange 14, however, does not extend within the interior of the tubular member 5, but on the contrary, extends radially outwardly beyond the confines thereof and cooperatively forms a channel with the end portion of the tubular member 5.

Secured to the outer surface of the member 11 is a spring plate 15 which is depressed when the member 11 is swung to engaging position as shown in FIG. 1, the opening-defining portions of the plenum chamber P and the inwardly extending flange 16 of the tubular member 5 serving to compress that plate member 15 until it passes inwardly of the flange 16 whereupon it springs outwardly and locks the member 11 in engaging position. A small opening 17 is provided in the wall of the tubular member 5 immediately outwardly of the latch member 15 when in the position shown in FIG. 1 so that a nail or other small object may be utilized to depress the spring element 15 and thereby release the member 11 so that it may be swung outwardly to the broken line position as shown in FIG. 1.

In use, the member 11 is swung to the broken line position shown in FIG. 1 preparatory to attaching the same to the plenum chamber P. The end portion carrying the member 11 is then inserted through the opening-defining portions of the plenum chamber P by first inserting the flange 6 so that the wall of the plenum chamber fits into the groove 8. The user then reaches inwardly of the tubular member 5 and swings the member 11 to the latching position shown in FIG. 1 whereupon the flange 14 will positively engage the opening-defining portion of the plenum chamber P and will, in cooperation with the flange 6, serve to securely connect the tubular member 5 to the plenum chamber P in a simple and practical manner. It will be readily appreciated that through this simple connection means a great deal of time and effort is saved. It will also be readily appreciated that a substantial amount of time and effort is saved in the event it is ever necessary to detach the tubular member 5, for it can be readily accomplished as hereinbefore described through simply releasing the spring element 15 and swinging the member 11 inwardly.

From the above it can be seen that I have provided an extremely simple and practical heat conduit fitting which will connect a heat conduit to a plenum wall chamber with a minimum of time, effort and expense as hereinbefore mentioned. One of the primary features of this fitting is that it can be manufactured so inexpensively and yet provide a highly efficient means for securing the heat conduit in sealed relation to the plenum wall chamber. Moreover, this fitting can be attached or detached from the plenum wall chamber by inexperienced and untrained personnel.

A second embodiment of my invention, as shown in FIGS. 3–5, includes a tubular member preferably made of metal and indicated generally by the numeral 20. This tubular member 20 has a flanged portion 20a at one end thereof extending outwardly from the wall thereof and at an angle thereto and having a sealing area lying substantially in a plane. This flanged portion 20a has outer dimensions greater than those of the opening-defining portions of the plenum chamber to overlie the same. As shown, this tubular member is provided with an outwardly and transversely extending flange 21 at the lower side of the opening-defining portions of that member at one end thereof. The tubular member 20, of course, is open at both of its ends and the one end 22 is adapted to be inserted or otherwise cooperatively connected with the hot air conduit (not shown) which is to be connected to the plenum chamber. The other end 23 of the tubular member 20 is rectangular in cross-sectional configuration as clearly shown in FIG. 4. The plenum chamber is indicated generally by the letter C.

The flange 21 extends only along one side of the rectangular open end of the tubular member 20 as best shown in FIG. 4. This flange 21 is an integral part of the tubular member 20 and is formed by the creation of a channel or valley indicated by the numeral 24 which is stamped into the opening-defining portions of the tubular member 20. As shown in FIGS. 3 and 4, this flange 21 engages the opening-defining portions of the plenum chamber C which have been indicated by the numeral 25. These opening-defining portions 25 extend into the channel or groove 24 when the fitting 20 is secured to the plenum chamber.

Pivotally mounted upon the end portion indicated by the numeral 23 is an inverted U-shaped plenum chamber wall engaging member 26. This member 26 is, as best shown in FIG. 5, angular in cross-section and is preferably formed of an angulated strip of metal pivotally secured by rivets 27 and 28 to the opening-defining portions of the tubular member 20 at the end portion 23. It will be noted that this element 26 pivots about the rivets 27 and 28 which means that the pivotable movement thereof is about an axis extending transversely of the tubular member 20. As a result of this pivotal mounting accomplished by the rivets 27 and 28, the member 26 may swing outwardly of the tubular member 20 to a non-engaging position relative to the opening-defining portions of the plenum chamber C as shown in broken lines in FIG. 3.

The inverted U-shaped member 26, as best shown in FIG. 5, is provided with an outwardly and transversely extending flange element 29. This flange element 29 serves to engage the inner surface of the opening-defining portions of the plenum chamber C when the member 26 is in latched position as shown in FIG. 3. It can be readily seen by reference to FIG. 3 that the member 26 serves to cooperatively engage the opening-defining portions of the plenum chamber C to positively secure, in cooperation with the channel 24, the tubular member 20 to the plenum chamber C. The flange element 29 extends around the three remaining sides of the rectangularly shaped opening in end 23 of the tubular member 20 and engages substantially all of the opening-defining portions of the plenum chamber wall C which are not engaged by the channel 24.

It will be noted that the inverted U-shaped member 26 which is angulated in cross-section is secured to the inner surface of the tubular member 20 and pivots inwardly of the outer end of that member when moved to plenum chamber wall engaging position as shown in FIG. 3. The flange element 29 however, does not extend within the interior of the tubular member 20, but on the contrary, extends transversely and outwardly beyond the confines thereof and cooperatively forms a channel at the side of the tubular member 20 opposite to the side bearing the channel 24. In this connection, it will be noted that the side of the end portion 25 disposed opposite the channel 24 is provided with an inwardly extending flange 30 which cooperates with the flange element 29 to form a channel to engage the opening-defining portions of the plenum chamber C at the upper side of the rectangular opening formed in the latter.

Secured to the outer surface of the U-shaped member 26 and at the upper side thereof is a spring plate 31 which is depressed when the member 26 is swung to engaging position as shown in FIG. 3. As the angulated member 26 is swung to the engaging position shown in FIG. 3, the opening-defining portions of the plenum chamber C and the inwardly extending flange 30 of the tubular member 20 serve to compress the spring plate 31 until it passes inwardly of the inwardly extending flange 30, whereupon it springs outwardly and locks the inverted U-shaped member 26 in plenum chamber wall engaging position. A small opening 32 is provided in the wall of the tubular member 20 immediately outwardly of the latch member 31 when in the position shown in FIG. 3 so that a nail or other small object may be utilized to depress the spring element 31 and thereby release the member 26 so that it may be swung outwardly to the non-engaging position shown in broken lines in FIG. 3.

In use, the member 26 is swung to the broken line position shown in FIG. 3, preparatory to attaching the same to the plenum chamber C. The end portion 23 which carries the member 26 is then turned either to the right or to the left relative to the rectangular opening in the plenum chamber wall C so that the member 26 may be inserted into the opening within the plenum chamber C. The end portion 23 is moved inwardly until the channel 24 receives the opening-defining portions of the plenum chamber C therein whereupon the tubular member 20 is turned in the reverse direction until the bottom side of the opening-defining portions of the opening in the plenum chamber C is received within this channel 24 and the member 26 is extending inwardly within the confines of the plenum chamber C. The user then reaches inwardly of the tubular member 20 from the end 22 and swings the member 26 to the latching position shown in FIG. 3 whereupon the flange 29 will positively engage the opening-defining portion of the plenum chamber C opposite the portion which is received within the channel 24 and also along the two opposite sides of the opening and will, in cooperation with the channel 24, serve to securely connect the tubular member 20 to the plenum chamber C in a simple and practical manner. It will be readily appreciated by those skilled in the art that this simple connection effects a considerable conservation of time and effort in accomplishing the connection. It will be even more readily appreciated by those skilled in the art that a substantial amount of time and effort may be saved through the use of this connection in the event it is ever necessary to detach the tubular member 20, for it can be readily detached from the plenum chamber C by merely depressing the spring plate 31 with a nail passed through the opening hereinbefore described in the wall of the tubular member 20 for that purpose and then swinging the U-shaped member 26 inwardly to the broken line position shown in FIG. 3.

From the above it can be seen that I have provided an extremely simple and practical heat conduit fitting which may be utilized to connect a heat conduit to a rectangular opening in a plenum chamber wall with a minimum of time, effort and expense. One of the most important features of this fitting is that it can be manufactured so inexpensively and yet can be attached and detached to the plenum chamber in sealed relation with a minimum of effort and loss of time. It is also important in this connection to note that this fitting can be attached or detached from the plenum chamber wall by relatively inexperienced and untrained personnel, thereby enabling a substantial portion of the installation as heretofore experienced being accomplished by relatively inexperienced personnel whereas it has previously been necessary for such connections to be accomplished by the most experienced personnel available.

It will, of course, be understood that various changes may be made in the form, details, arrangement and proportions of the component parts and steps without departing from the scope of my invention which consists of the matter shown and described herein and set forth in the appended claims.

What is claimed is:

1. A conduit fitting for connecting a conduit to opening-defining portions of a plenum chamber wall comprising, an open-ended tubular member having a flanged portion at one end thereof extending outwardly at an angle to the wall and having a sealing area lying substantially in a plane, said flanged portion having its outer circumference greater than that of the opening-defining portions of the plenum chamber whereby the tubular member overlies the opening-defining portion of the plenum chamber, means on said flanged portion adapted to engage the opening-defining portions of the plenum chamber and to extend outwardly thereof and adapted to hold substantially one side portion of said tubular member in sealing relationship with said plenum chamber wall, and a flange member disposed in substantial opposing relation to said flanged portion of said tubular member and encompassing substantially the remaining portion of said tubular member when in operative position and having portions extending substantially radially and outwardly of the said opening-defining portions when in operative position, said flange member being swingably connected at substantially opposite pivot points adjacent the ends of said one side portion to said end portion of the tubular member, said pivot points being so located with respect to said first-mentioned means that when said flange member is in operative position, the remaining portion of said tubular member is drawn into and held in sealing relationship with said plenum chamber to lock said tubular member thereon, said flange member being swingable axially inwardly of said tubular member from non-engaging position to cooperative plenum wall engaging position.

2. A conduit fitting for connecting a conduit to opening-defining portions of a plenum chamber wall comprising, an open-ended tubular member having a flanged portion at one end thereof extending outwardly from the wall thereof and at an angle thereto and having a sealing area lying substantially in a plane, said flanged portion having outer dimensions greater than those of the opening-defining portions of the plenum chamber whereby the tubular member overlies the opening-defining portion of the plenum chamber, means on said flanged portion adapted to engage opening-defining portions of the plenum chamber and to extend outwardly therefrom and adapted to cooperatively hold substantially one side portion of said tubular member in sealing relationship with said plenum chamber wall, and a flange member disposed in substantial opposing relation to said flanged portion of said tubular member and encompassing substantially the remaining portion of said tubular member when in operative position and having portions extending outwardly of the opening-defining portions of the plenum chamber when in operative position, said flange member being swingably connected at substantially opposite pivot points adjacent the ends of said one side portion to said end portion of the tubular member, said pivot points being so located with respect to said first-mentioned means that when said flange member is in operative position and cooperating with said first-mentioned means, said remaining portion of said tubular member is drawn into and held in sealing relationship with said plenum chamber to secure said tubular member thereon, said flange member being swingable axially inwardly of said tubular member from non-engaging position to cooperative plenum wall engaging position.

3. A conduit fitting for connecting a conduit to opening-defining portions of a plenum chamber wall comprising, an open-ended tubular member having a flanged portion at one end thereof extending at an angle to the wall thereof and having a sealing area lying substantially in a plane, said flanged portion having outer dimensions greater than those of the opening-defining portions of the plenum chamber whereby the tubular member overlies the opening-defining portion of the plenum chamber, means on said flanged portion adapted to engage opening-defining portions of the plenum chamber and to extend outwardly therefrom and adapted to cooperatively hold substantially one side portion of said tubular member in sealing relationship with said plenum chamber wall, and a flange member disposed in substantial opposing relation to said flanged portion of said tubular member and encompassing substantially the remaining portion of said tubular member when in operative position and having portions extending outwardly of the opening-defining portions of the plenum chamber when in operative position, said flange member being swingably connected at substantially opposite pivot points adjacent the ends of said one side portion to said end portion of the tubular member, said pivot points being so located with respect to said first-mentioned means that when said flange member is in operative position and cooperating with said first-mentioned means, said remaining portion of said tubular member is drawn into and held in sealing relationship with said plenum chamber to secure said tubular member thereon, said flange member being swingable axially inwardly of said tubular member from non-engaging position to cooperative plenum wall engaging position.

4. A conduit fitting for connecting a conduit to opening-defining portions of a plenum chamber wall comprising, an open-ended tubular member having a flanged portion at one side thereof extending radially outwardly from one end portion thereof adjacent its open end and extending substantially half way around the circumference thereof, and a substantially semi-circular flange member L-shaped in cross-section swingably connected adjacent its ends to said end portion of said tubular member adjacent the ends of said flanged portion and disposed opposite said flanged portion of said tubular member and cooperating therewith to cooperatively engage the opening-defining portions of such a plenum chamber wall and lock said tubular member thereon, said member being swingable axially inwardly of said tubular member from non-engaging position to cooperative plenum-wall engaging position.

5. The structure defined in claim 4 wherein the swinging movement of said flange member is about an axis having a strong radial component relative to said tubular member.

6. A conduit fitting for connecting a conduit to opening-defining portions of a four-sided rectangularly shaped opening of a plenum wall chamber wherein the fitting can be inserted and connected in place entirely from one side of the plenum wall comprising, an open-ended tubular member having an end portion shaped rectangularly in cross-section, an outwardly facing channel carried by said end portion and extending along a section of the periphery of said end portion and being adapted to engage a section of the opening-defining portions of such a plenum chamber wall along one side of said opening, and cooperative plenum chamber wall-engaging means pivotally connected to said end portion of said tubular member for pivotal movement outwardly of said member about an axis extending transversely of said end portion of said tubular member, said cooperative wall-engaging means being pivotable between non-engaging and cooperating plenum-wall-engaging positions along the remaining sides of said opening and cooperating when in said latter position with said channel to secure said tubular member to the opening-defining portions of the plenum chamber providing a seal between the plenum chamber wall and the fitting substantially all the way around said opening.

7. The structure defined in claim 6 wherein said end portion of said tubular member has an inwardly extending flange element carried by another section of the opening-defining portions of said end portion, said inwardly extending flange element being disposed in cooperating relationship with said pivoted member to cooperatively form plenum-wall-engaging means therewith when said pivoted member is moved to plenum-wall-engaging position.

8. The structure defined in claim 6 wherein said end portion of said tubular member has an inwardly extending flange element carried by another section of the opening-defining portions of said end portion and disposed opposite said channel, said inwardly extending flange element being disposed in cooperating relationship with said pivoted member to cooperatively form a plenum-wall-engaging channel therewith when said pivoted member is moved to plenum-wall-engaging position.

9. The structure defined in claim 6, and releasable spring latching means carried by said pivoted member for positively retaining said pivoted member in plenum chamber wall-engaging position.

10. The structure defined in claim 6, wherein said end portion of said tubular member has an inwardly extending flange element carried by another section of the opening-defining portions of said end portion, said inwardly extending flange element being disposed in cooperating relationship with said pivoted member to cooperatively form a plenum-wall-engaging means therewith when said pivoted member is moved to plenum-wall-engaging position, and releasable latching means carried by said pivoted member for positively retaining said pivoted member in plenum chamber wall-engaging position.

11. A conduit fitting for connecting a conduit to opening-defining portions of a plenum chamber wall comprising an open-end tubular member, abutment means carried by said tubular member adjacent one end portion thereof for abutting against the exterior surface of the opening defining portions of the plenum chamber wall, a circumferentially extending flange carried by said tubular member outwardly of said means and disposed at the side of said one end portion of said tubular member, said flange extending outwardly at an angle to the wall of said tubular member and having a sealing area lying substantially in a plane and having its outer circumference greater than that of the opening-defining portions of the plenum chamber, said flange being adapted to engage the opening-defining portions of the plenum chamber and to extend outwardly thereof and adapted to hold substantially one side portion of said tubular member in sealing relationship with said plenum chamber wall, and a second flange member disposed in substantially opposing relation to said first mentioned flange and encompassing substantially the remaining portion of said tubular member when in operative position and having portions extending outwardly of the fitting when in operative position, said second mentioned flange member being swingably connected at substantially opposite pivot points adjacent the ends of said one side portion to said end portion of said tubular member, said pivot points being so located with respect to said first mentioned flange that when said second mentioned flange member is in operative position, the remaining portion of said tubular member is drawn into and held in sealing relationship with said plenum chamber to lock said tubular member thereon, said second mentioned flange member being swingable axially inwardly of said tubular member from non-engaging position to cooperative plenum wall engaging position.

References Cited in the file of this patent

UNITED STATES PATENTS

| 527,625 | Sommer | Oct. 16, 1894 |
| 1,139,188 | Kane | May 11, 1915 |
| 1,511,982 | Schilling | Oct. 4, 1924 |
| 2,799,518 | Anderson et al. | July 16, 1957 |
| 2,880,017 | Anderson et al. | Mar. 31, 1959 |

FOREIGN PATENTS

| 372,198 | Germany | Mar. 24, 1923 |
| 298,239 | Germany | Jan. 20, 1931 |